(12) United States Patent
Lozier et al.

(10) Patent No.: US 6,536,663 B1
(45) Date of Patent: Mar. 25, 2003

(54) SELF SERVICE KIOSK WHICH DISPENSES VOUCHERS

(75) Inventors: Bradley L. Lozier, Centerville, OH (US); Morrison Reyner, Clackmannanshire (GB); James D. Sampier, Springboro, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/481,767

(22) Filed: Jan. 11, 2000

(51) Int. Cl.$^7$ ............................................. G06F 17/60
(52) U.S. Cl. ..................... 235/379; 235/381; 235/383; 235/386; 235/487; 902/30; 902/35
(58) Field of Search ................................. 235/379, 381, 235/383, 386, 487; 902/30, 35

(56) References Cited

U.S. PATENT DOCUMENTS

| | | | | |
|---|---|---|---|---|
| 4,179,723 A | * | 12/1979 | Spencer ...................... 361/384 |
| 5,025,139 A | * | 6/1991 | Halliburton, Jr. ........... 235/379 |
| 5,055,657 A | * | 10/1991 | Miller et al. ................. 235/381 |
| 5,442,567 A | * | 8/1995 | Small ...................... 235/381 X |
| 5,797,470 A | * | 8/1998 | Bohnert et al. .............. 186/53 |
| 5,953,709 A | * | 9/1999 | Gilbert et al. ............... 705/35 |
| 5,987,439 A | * | 11/1999 | Gustin et al. ............... 235/379 |
| 5,992,570 A | * | 11/1999 | Walter et al. ................ 186/36 |
| 6,000,806 A | * | 12/1999 | Dallman ...................... 362/85 |
| 6,047,807 A | * | 4/2000 | Molbak ....................... 194/217 |
| 6,048,269 A | * | 4/2000 | Burns et al. .................. 463/25 |
| 6,061,666 A | * | 5/2000 | Do et al. ................. 235/379 X |
| 6,129,273 A | * | 10/2000 | Shah .......................... 235/380 |
| D436,630 S | * | 1/2001 | Gonsirorowski et al. .... D20/10 |

* cited by examiner

*Primary Examiner*—Karl D. Frech
*Assistant Examiner*—Daniel Walsh
(74) *Attorney, Agent, or Firm*—Gregory A. Welte

(57) ABSTRACT

A coupon-dispensing kiosk for use at retail locations. The kiosk may, or may not, contain an Automated Teller Machine, ATM. The kiosk performs financial services, such as cashing checks. However, to avoid dispensing coins to customers, the kiosk prints coupons and dispenses them. The coupons will be redeemed by merchants associated with, or in close proximity to, the kiosk. The kiosk can be located, for example, at a shopping mall or local convenience store.

16 Claims, 2 Drawing Sheets

SELF SERVICE KIOSK WHICH DISPENSES VOUCHERS

The invention concerns a self-service kiosk which dispenses vouchers, or coupons, to settle a balance owed to a customer in connection with a transaction.

BACKGROUND OF THE INVENTION

The Inventors have identified a need for delivering fractional currency amounts to customers in certain situations. The invention achieves delivery of these amounts, but without using the fractional currency itself. The following discussion explains the need, and why it arises.

Automated Teller Machines, ATMs, are in widespread use. One service which the ATM provides is to accept the deposit of bank checks from customers. The ATM may dispense currency to the customer, based on the check, depending upon the agreement existing between the customer and the owner of the ATM.

However, if the ATM does dispense currency, the amount will probably not equal the full amount of the check, because the full amount may include fractional values which can only be covered by coins. For example, in the U.S., monetary amounts contain two parts: a "dollar" amount, together with a fractional amount stated in hundredths of a dollar, commonly called "cents," which is an abbreviation for "centi-dollars."

The latter amount must be handled by the transfer of metal coins. Many ATMs handle such coin-amounts by crediting the coin-amount to the customer's bank account.

The ATMs could dispense coins, but that approach imposes significant cost on the owner of the ATM, in terms of (1) the monetary costs of purchasing and maintaining the coin-dispensing mechanism, and also (2) the space required to store the coin-dispensing mechanism. Many ATMs are located in retail environments, where space is costly.

Thus, today, reasons exist why coin-dispensing mechanisms are not installed in ATMs. But a need for such mechanisms is increasing, and it can be explained as follows.

Consumer demand is arising for extension of ATM services to customers who, for various reasons, do not maintain bank accounts. The reasons may include (1) a distrust of banks, (2) a preference for dealing exclusively in cash, or (3) an infrequent need for a bank account. The last factor, infrequent need, promotes avoidance of a bank account because many banks impose penalties on people who maintain small accounts, or who write checks infrequently.

Even though these people lack accounts, they must still cash checks, such as payroll checks and government checks. It would seem that these checks could be cashed at a bank, but that is not done, for two primary reasons.

The first is distance: the banks on which the checks are drawn will cash the checks, and may be legally required to do so. However, visiting the drawee-bank often requires travelling a long distance.

The second reason is that other banks, in general, will cash the checks, but only if the customer maintains an account at the bank. But, as stated above, the people under consideration do not maintain bank accounts.

Therefore, people lacking bank accounts must travel long distances to cash checks. To avoid the travel, many of these people cash checks at so-called "money stores," which impose large fees.

ATMs are being provided with the facility to provide check-cashing services to such people. However, as explained above, many of the checks will contain fractional amounts. The fractional amounts cannot be credited to an account for such people, and coin-dispensing mechanisms for settling the fractional amounts are not a preferred option.

OBJECTS OF THE INVENTION

An object of the invention is to provide an improved self-service kiosk.

A further object of the invention is to provide a self-service kiosk which resolves the problem of dispensing coins to customers.

SUMMARY OF THE INVENTION

In one form of the invention, a kiosk issues coupons to a customer to satisfy a balance owed the customer. The coupons will be treated as cash by merchants associated with the kiosk.

DETAILED DESCRIPTION OF THE INVENTION

Figure 1:
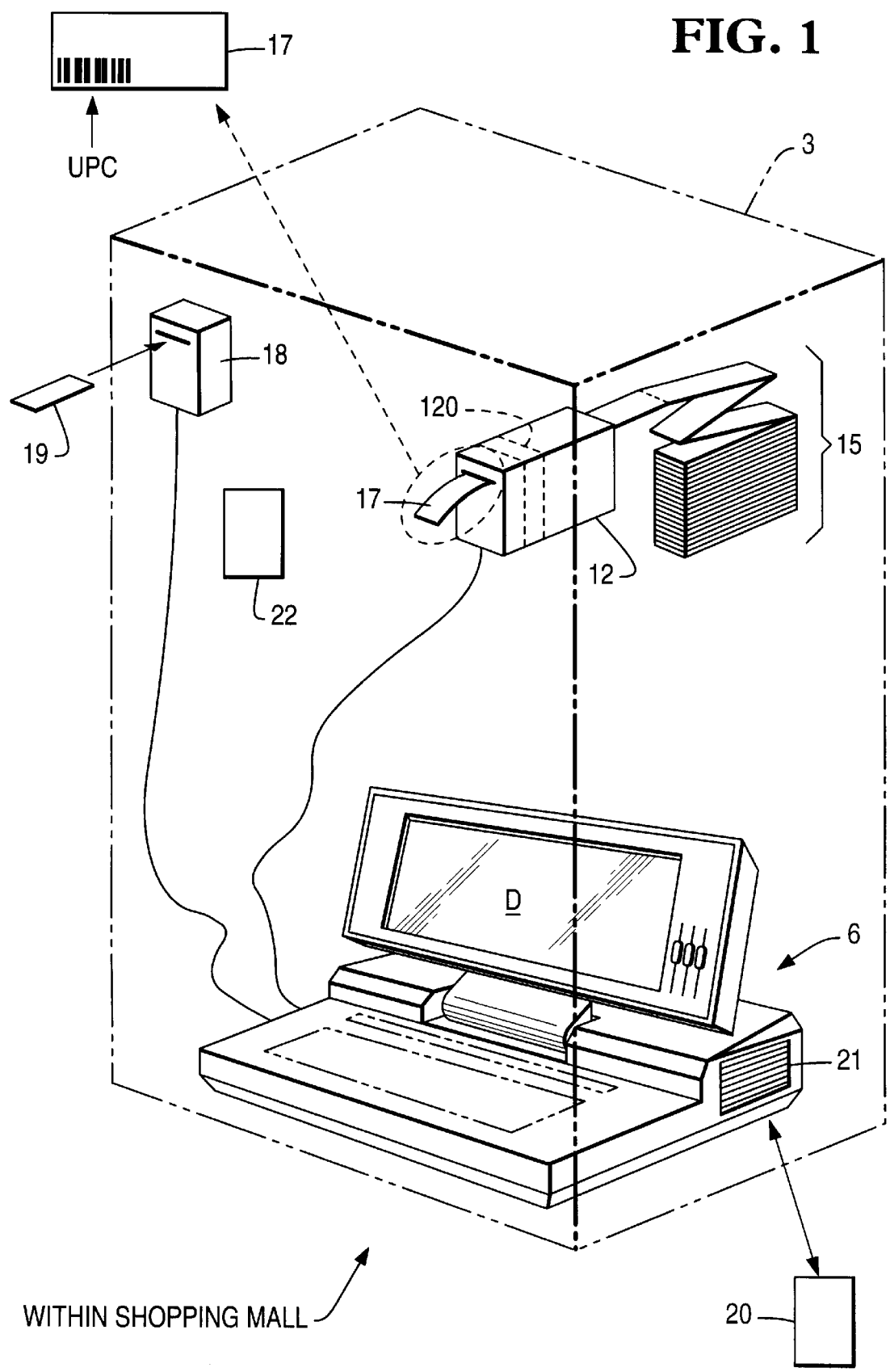
FIG. 1 illustrates one form of the invention.

FIG. 1 represents a self-service kiosk 3, such as an ATM machine. Contained within the kiosk 3 is a portable microcomputer 6, containing a display D, which represents the display which is viewed by a customer.

The architecture of one form of the invention will be described in the context of such a computer. One reason for this approach is that the widespread usage of such microcomputers has driven their prices to low levels. As a result, such computers are readily attainable, and useful both for (1) prototyping products under development, and (2) small production runs of those products, once developed.

Further, because of the low price, the microcomputer is often suitable for larger manufacturing runs of the product, even if the product does not require the full processing power of the microcomputer, but could utilize less powerful logic circuitry.

Of course, no necessity exists that the portable microcomputer actually be used. Factors such as a need for (1) large production runs or (2) small size and weight can militate in favor of custom-designed circuitry. However, even in these cases, the architecture of this computer has been implemented in systems of very small size. For example, miniature single-board computers which implement the so called "personal computer architecture" are available from Octagon Systems, 6510 West 91st Avenue, Westminister, Colo.

The kiosk 3 is also equipped with a printer 12, which prints text and images onto paper drawn from a stock 15. Fanfold paper is shown. Alternately, stacked paper sheet or paper rolls (neither shown) can act as the stock. The printer delivers the printed paper, or coupon 17, to the customer.

The kiosk 3 is further equipped with a card reader 18 which accepts an identity card 19 from the customer. Programming, represented by block 21, runs on the computer 6, and controls the operations described below. A currency dispenser 22 is provided, which delivers currency to the customer.

In normal operation, a customer (not shown) inserts an identity card 19, and logs into the kiosk 3 in the usual manner. From the customer's perspective, the log-in procedure may be identical to that undertaken at ordinary ATMs. However, from the kiosk's perspective, the log-in procedure may be different.

As discussed in the Background, a given customer may not maintain an account at any financial institution. Consequently, the kiosk 3 will not be able to obtain information about an account, such as the presence of a balance, or the amount of the balance. Nor will the kiosk 3 be able to credit or debit amounts to an account.

Nevertheless, the kiosk verifies the customer's identity. Several approaches are possible. In one approach, the card 19 is a standard ATM card, and is assigned a specific Personal Identification Number, PIN. If the customer presents both the card and the correct PIN to the kiosk, the customer's identity is considered verified.

In another approach, the kiosk consults a remote database 20 which contains personal information which only the customer should know, such as date of birth, high school attended, and so on. The kiosk asks a few questions of the customer, based on the data, and verifies the identity of the customer, based on the customer's answers.

In some situations, it is envisioned that no identity verification of the customer is undertaken at all. That is, in certain transactions, the identity of the customer is simply not relevant. For example, if a kiosk accepts currency, which the kiosk verifies as valid, and dispenses articles of value in return, no need arises to verify the identity of a customer.

After the customer logs in, the customer undertakes a transaction. After the transaction terminates, a monetary balance may be owed to the customer. To deliver the balance to the customer, the kiosk 3 prints a monetary amount on a coupon 17, using printer 12, and delivers the printed coupon to the customer. Some specific examples of coupons are the following:

EXAMPLE 1

The coupon may possess all the characteristics of a bank check, and can be spent as such. The bank checks may name a "payee," such as the customer, if the kiosk 3 knew the name of the customer in the transaction. Alternately, if the customer's name is not known, the check may be drawn to "bearer," and will be treated as bearer paper.

The customer may treat the coupon-checks in several different ways. The customer may (1) cash the coupon-check at a nearby bank, (2) use the check to later pay part of a bill owed by the customer, by endorsing the check to the billing agency, or (3) merchants associated with the kiosk may honor the coupon-checks, without asking the customer for identification.

In one embodiment, the checks bear an imprint such as "Not Valid for More than XXX Dollars," wherein "XXX" is a small number, such as five or ten dollars, to discourage potential thieves from breaking into the kiosk 3 and stealing the blank coupon-checks.

EXAMPLE 2

Since many people who visit malls travel by automobile, the coupons may be issued in units of gasoline, such as one gallon per coupon. Similarly, if the coupons are issued at an airport, they may be issued in units of parking fees, or local transportation.

EXAMPLE 3

The coupons may be issued in units of money, but the coupons are only accepted by a limited group of merchants. For example, one or more kiosks 3 may be present in a mall. All merchants in the mall agree to honor the coupons.

In this example, since the kiosk 3 can be seen as providing a benefit to all the merchants in the mall, the merchants may agree to jointly pay for the kiosk, on a pro rata basis, based on the square footage of their respective stores.

Alternately, each merchant may pay a proportionate share, based on the percentage of the total coupons which the merchant redeems. For example, if a kiosk dispenses coupons valued at 100,000 units in one month, and merchant A redeems 1000 units, that merchant would be assessed $1000/100,000$, or one percent, of the cost of the kiosk for that month.

This approach presents the advantage of reducing risk to the merchants. That is, the merchants will see the kiosk initially as a novel apparatus, and will probably see no justification for paying for the kiosk. But if the cost to each merchant is based on whether the merchant utilizes the kiosk, then risk to the merchant is reduced, or eliminated.

Additional Embodiment

Multiple classes of refunds to the customer are possible, with a different type of coupon given for each. For example, if the refund is of nominal value, the coupons described above can be used. "Nominal" can be defined as equal in value to a loaf of bread, or less than one dollar, in the U.S., in the year 1999.

If the refund exceeds the nominal value, then another type of coupon is issued. Issuance of that coupon may require that the customer be identified, if not identified already. The coupon may take the form of a bank check.

Under this embodiment, it may be necessary to provide two printers 12 in FIG. 1, one for each type of refund.

Flow Chart

Figure 2:
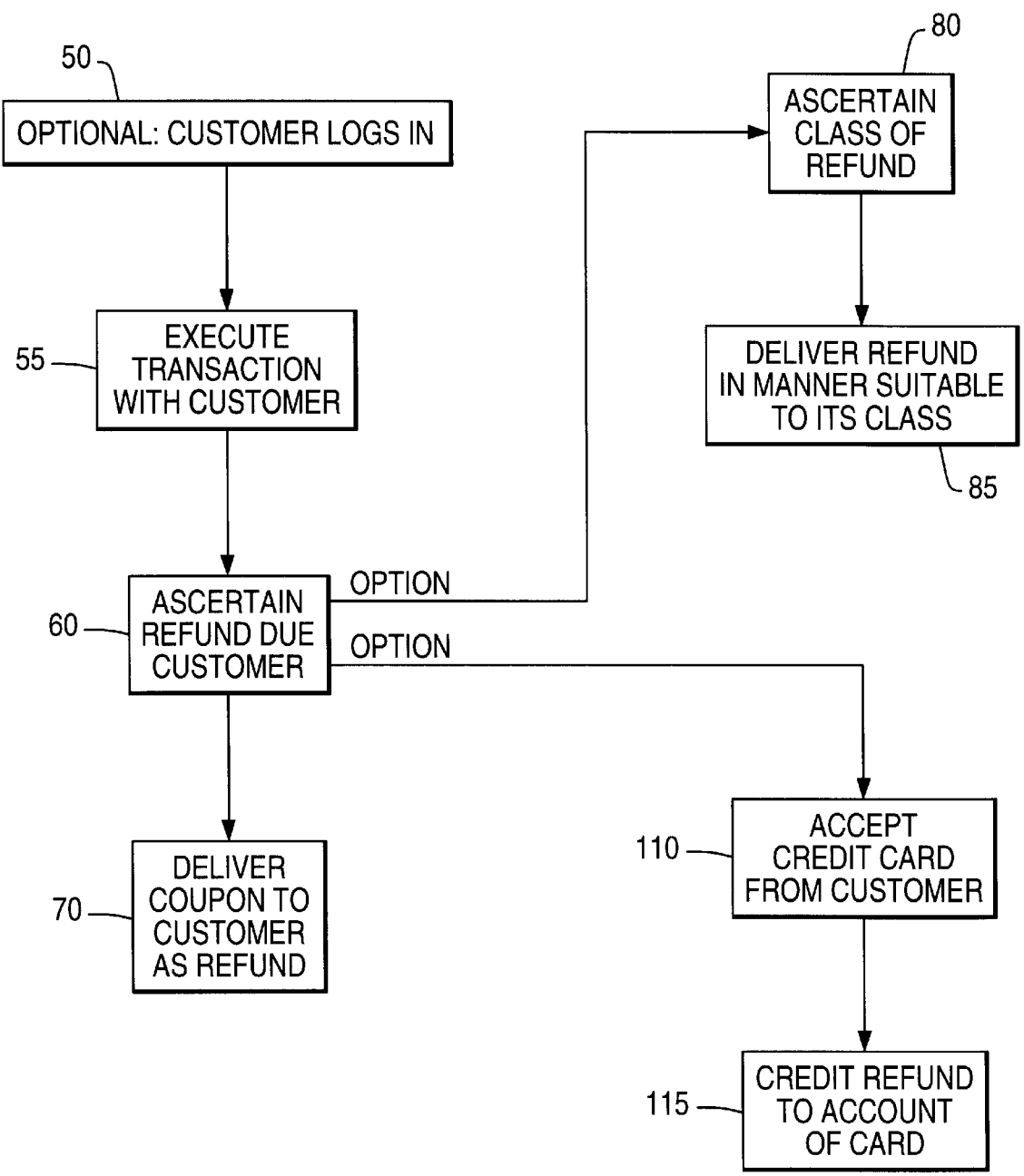
FIG. 2 is a flow chart of logic implemented by one form of the invention.

FIG. 2 is a flow chart illustrating logic undertaken by one form of the invention.

Block 50 is optional, and indicates that the customer logs in. Block 55 indicates that the customer executes a transaction. Block 60 indicates that the kiosk 3 ascertains a refund which is due to the customer. At this block, three paths can be taken.

In one path, block 70 is reached, and a coupon, as described above, is delivered to the customer. In a second path, block 80 is reached, wherein the kiosk 3 ascertains the class in which the refund lies. For example, the refund can be classified as "nominal," or "greater than nominal." Block 85 indicates that the refund is tendered to the customer in a manner which corresponds to the class of the refund, for example, coupon versus check.

In the third path, block 110 is reached, wherein the customer tenders a credit card to the kiosk 3. Next, in block 115, the kiosk 3 causes a credit to be added to the customer's account, represented by the credit card.

Additional Considerations

1. For security, the coupons can be printed on blank forms, which are themselves difficult to duplicate. When a coupon is generated, the printer 12 in FIG. 1, in effect, "fills the blank" on a pre-printed form, indicating the value of the coupon.

The blank coupons can be printed using the same processes which are used to produce other documents which are intended to be difficult-to-copy, such as negotiable instruments, paper currency, stock certificates, and postage stamps. Offset lithography and intaglio represent two such processes.

Hair-sized metallic wires can be contained within the paper on which the coupon is printed.

In another approach, security measures are largely ignored, and standard, roll-type, cash-register tape is used as the paper on which the coupon is printed.

2. Universal Product Codes, UPC, are in widespread usage. Many, if not most, products sold in the United States are assigned a UPC. The UPC is printed on the product, or its package, in the form of (1) a string of numbers, (2) a bar code (also called piano code), or both (1) and (2). A centralized private agency maintains the roster of products, and their respective UPCs, and makes that roster available to merchants.

The coupon described herein can be assigned a UPC, for security, and also for tracking the usage of the coupons, as for the assessments described above. FIG. 1 illustrates a coupon 17, bearing a UPC. The UPC allows a merchant to scan the coupon, to ascertain whether the coupon bears a genuine UPC. If so, the presence of the UPC not only indicates authenticity of the coupon, it also specifies the value of the coupon. That is, the UPC-database of the merchant was previously informed of the value assigned to that specific UPC code. Alternately, the merchant can transmit a message to the central UPC agency, by direct telephone connection or over the INTERNET, inquiring as to the value of the coupon. The agency responds by stating the value.

While it is not impossible for thieves to counterfeit such coupons, the fact that the coupons in question have nominal value is considered a significant deterrent to counterfeiting.

3. The printer 12 in FIG. 1 may be accompanied by an embossing mechanism, indicated in as phantom block 120, which embosses each coupon with a 3-dimensional, tactile stamp.

4. The blank coupons can be manufactured using offset lithography, to thereby contain very fine, detailed imagery, such as hatching or small alphanumeric characters, as found on many types of government currency. Such fine detail is difficult to reproduce using an electrostatic toner-based photocopy process.

The Inventors believe that presently available lithographic equipment can produce single-color images having a resolution of 1,000 to 1,200 dots per inch (dpi). Commonly, in generating four-color images, this resolution is allowed to drop to the range of 400–600 dots per inch, although more expensive processing can produce higher resolutions in the fourcolor image. In contrast, the Inventors believe that presently available electrostatic color copiers produce a resolution of about 320 dpi.

None of these resolutions will accurately reproduce the fine detail contained in government currency produced by the intaglio process.

5. The blank coupons can be printed upon paper having a characteristic watermark. Duplication of the check will require that a counterfeiter obtain paper stock having the same watermark.

6. Continuous feeding can be accomplished by using fan-fold paper or roll paper. Continuous feed, and, specifically, continuous feed using roll paper, is preferable, for simplicity of the feeding mechanism. Continuous feeding commonly uses coupons which are printed on paper which contains holes for a tractor-feed mechanism. The tractor-feed mechanism (known in the art) controls the position of the checks during printing, and allows proper registration of the printed matter.

Other types of feeding arrangements, such as sheet-feeding, can be used.

Roll paper, as the name implies, comprises a lengthy ribbon of paper, rolled into a tight spiral. Cash-register tape provides an example of roll paper.

7. Dispensing of "coupons" is discussed herein. ATMs commonly dispense currency, which is not a coupon. One reason is that currency is printed by, and issued by, a government. Issuance of currency by other parties is illegal. The coupons described herein are not currency. Thus, the origins of a coupon and currency are different.

A second reason is that, by government fiat, currency must be accepted as legal tender for debts. Coupons are not required to be so accepted.

8. A distinction should be drawn between the invention and issuance of other types of coupons, or tokens. For example, certain municipal transportation systems maintain machines which issue passcards bearing magnetic stripes. The passcard is used as a ticket to obtain passage on a commuter train. Presumably, the municipality will issue a refund for the current value of a passcard, if the passcard is surrendered.

As another example, other municipalities maintain machines which issue coin-like tokens, which are also used as tickets on commuter trains.

As a third example, video game arcades issue similar tokens, which are used as currency to purchase time on video games.

However, in all three situations, a single transaction is involved in the acquisition of the coupon-token, namely, the purchase of the coupon-token. In contrast, under the invention, at least one other transaction is involved, such as depositing a check.

Restated, under the invention, a first transaction is undertaken (e.g., depositing a check) which causes a first result, such as dispensing money to the customer, or crediting money to a customer's bank account. The coupon issuance only occurs after the first result. That is, under the invention, coupon-issuance is not the sole result of the transaction: it must follow, or at least accompany, the first transaction.

Further, in another form of the invention, the value of coupons depends on the first result of the transaction. For example, if a check for $ 51.55 is cashed, and if 51 dollars are dispensed to a customer, coupons for 55 cents may then be issued. The value of the coupons depend depend on (1) the amount of the check and (2) the currency dispensed (which is the first result).

Further still, under the invention, currency is not tendered by the customer. In fact, in many cases, the opposite occurs: the kiosk dispenses currency to the customer. In contrast, when subway tokens, or the like, are purchased by a customer, the customer does tender currency.

9. In one form of the invention, the functionality of the apparatus of FIG. 1 is added to an existing ATM. That is, the ATM now issues coupons as "change."

In another form of the invention, the functionality of the apparatus of FIG. 1 is added to a specific subset of the functionality of an existing ATM. That is, the ATM acts as a "normal" ATM for some customers, such as those who maintain bank accounts. The ATM also contains the equipment described herein, and acts as a different entity for customers who do not maintain bank accounts.

For example, if a customer lacking a bank account wishes to undertake a financial transaction such as cashing a check, that person tenders the check to the ATM/kiosk 3 in FIG. 1. However, the ATM/kiosk 3 does not contact a financial institution at which the customer maintains an account because, by stipulation, the customer maintains no such account. Restated, no account information about the customer is sought, or obtained (although an account on which the check is drawn may be contacted).

The ATM/kiosk 3 may take steps to verify the validity of the check, or to verify the identity of the customer, but, again, no contact is made with a financial institution at which the customer maintains an account.

The ATM/kiosk 3 then either rejects, or accepts the check. In the latter case, the ATM/kiosk 3 dispenses currency, plus one or more coupons as a refund of small amounts, if required.

10. It is not necessary that the coupons 17 be printed at the kiosk. The stock 15 can be pre-printed, and may require no further processing by the kiosk, apart from dispensing. In this case, multiple coupons may be issued in a given transaction. For example, assume that the coupons are valued at 25 cents each. A refund of 75 cents would require three coupons.

If a non-multiple of a coupon's value is required, such as 65 cents, the refund is rounded up, or down, in order to assure no net loss to the kiosk over time. For example, the refund can be rounded to the nearest integral coupon value, which would be 75 cents in this example. (A refund of 60 cents would be rounded to 50 cents, of course.)

The refund can be rounded randomly. The refund can be rounded always upward, in the customer's favor, and the loss can be sustained by the merchants.

11. In the prior art, coupons are distributed to customers by way of newspapers. The customers cut them from the paper, and take them to a market for redemption. The coupons bear bar codes, which are presumably UPCs.

The invention issues such coupons. However, the invention's coupons differ from the prior-art coupons in the respect that the invention's coupons can be designed to be treated as cash. That is, the merchant redeeming the coupon treats it as cash, and the merchant is reimbursed in a manner similar to that used for reimbursement of ordinary product-promotion coupons.

12. In one form of the invention, the kiosk of FIG. 1 is stationed at a shopping mall. In a financial transaction undertaken at the kiosk, if a customer is due a refund, the customer is offered coupons which will be treated as cash by some, or all, of the merchants in the mall.

In addition, the customer is offered an alternative: a collection of product-discount coupons. Further, the total face value of the collection is significantly larger than the refund due the customer.

For example, assume that the refund due is 99 cents. The customer is offered refund coupons values at 99 cents, as discussed above. In addition, the customer is offered a collection of product-discount-coupons having a face value of, say, twenty dollars. These would be redeemed at shops in the mall.

In addition, different collections of coupons can be offered. For example, men and women have different shopping habits, as do people of different ages, incomes, ethnic backgrounds, and so on. The invention may ask for any information which the customer may care to offer, which classifies the customer into a demographic group, and offers an appropriate packet of coupons.

If a customer does not wish to volunteer information, the invention may offer a selection of pre-arranged collections. For example, one classification may include coupons redeemable at sporting goods shops, tool stores, and electronics stores. Another classification may include coupons redeemable at women's clothing stores and shoe stores. A third classification may include coupons redeemable at book stores.

The coupons are preferably printed at the time of issuance. That is, preferably, no stock of coupons is maintained in the kiosk of FIG. 1.

13. It is emphasized that the coupons are issued in connection with another transaction. They are not issued alone. Further, the other transaction does not always result in issuance of a coupon. For example, in the U.S., if the coupons are issued in place of coins, then the value of a coupon will range from 1 cent to 99 cents. If the amount of a refund in a given transaction is treated as a random variable, then the refund can assume any integral value in this range, plus a value of zero. The latter value, zero, will occur statistically in one percent of the cases.

14. A specific example of the invention is found in the following procedure. A person lacking a bank account presents a bank check to the kiosk of FIG. 1. The kiosk may, or may not, take verification steps, of either the person or the check. The kiosk issues paper currency to the person, and perhaps deducts a service charge. If the quantity (face value of the check minus the paper currency issued minus the service charge) is non-zero, then a refund is due the customer. Coupons are issued in settlement of that refund.

15. A patent application, assigned to the assignee of the present application, is pending which covers apparatus which performs the operations described in point number 13, above. This application bears Ser. No. 09/329,102, was filed on Jun. 9, 1999, is entitled "Check Cashing at Automated Teller Machines," and the inventor is Jerome Otto. This application is hereby incorporated by reference.

16. One definition of "coupon" is "a non-currency document for which another party will exchange an item of value." Another definition is "a non-currency document for which another party will reduce a price on an item of value upon purchase." The term "non-currency" is significant, because, without that condition, governmental currency may fall under these definitions. Coupons are not currency.

17. The preceding discussion was framed in terms of siting the invention at a shopping mall. It should be recognized that the invention can be situated at other locations, such as convenience stores, and also installed as a self-service kiosk, at locations such as airports, train stations, and other places frequented by the general public.

Numerous substitutions and modifications can be undertaken without departing from the true spirit and scope of the invention. What is desired to be secured by Letters Patent is the invention as defined in the following claims.

What is claimed is:

1. A kiosk, comprising:
 a) first means for executing, with a customer, a financial transaction involving a financial institution; and
 b) second means for ascertaining whether the transaction results in a refund due the customer and, if so,
   i) printing one or more paper coupons having face values determined by the refund, and
   ii) delivering the coupons to the customer.

2. Kiosk according to claim 1, wherein the face value of the coupons equals the refund amount.

3. Kiosk according to claim 1, wherein the second means records the value of the coupons delivered.

4. Kiosk according to claim 1, wherein the financial transaction involves dispensing currency to the customer.

5. Kiosk according to claim 1, and further comprising:
c) printer means which prints and delivers a receipt to the customer, which indicates predetermined data relating to the financial transaction.

6. Kiosk according to claim 1, wherein the financial institution comprises a bank.

7. Kiosk according to claim 1, wherein the financial transaction involves altering a monetary balance of an account held in the financial institution.

8. A kiosk, comprising:
a) first means for executing a financial transaction with a customer; and
b) second means for ascertaining whether the transaction results in a refund due the customer and, if so,
  i) printing one or more paper coupons having face values determined by the refund, and
  ii) delivering the coupons to the customer, wherein the face value of the coupons exceeds the refund amount.

9. A kiosk, comprising:
a) first means for executing a financial transaction with a customer; and
b) second means for ascertaining whether the transaction results in a refund due the customer and, if so,
  i) printing one or more paper coupons having face values determined by the refund, and
  ii) delivering the coupons to the customer, wherein the face value exceeds the refund amount by at least a factor of ten.

10. A system, comprising:
a) an Automated Teller Machine, ATM, which contains a currency dispenser; and
b) printer means which prints and issues the following to the customer:
  i) receipts and
  ii) non-currency coupons
    wherein
    i) the ATM does not obtain account information about some customers; and
    ii) non-currency coupons are issued to said customers.

11. A system, comprising:
a) an Automated Teller Machine, ATM, which contains a currency dispenser; and
b) processing means for
  i) accepting a bank check from a customer,
  ii) computing a balance due the customer,
  iii) delivering to the customer paper currency; and
  iv) delivering paper coupons to the customer, if the paper currency does not equal the balance due.

12. System according to claim 11, wherein the balance due is derived from an amount stated on the bank check.

13. System according to claim 11, wherein the balance due is derived from an amount stated on the bank check, and the paper currency is delivered in an amount derived from the balance due.

14. System according to claim 11, wherein the paper currency is delivered in a process of cashing the bank check.

15. A system, comprising:
a) an Automated Teller Machine, ATM, which contains a currency dispenser; and
b) processing means for
  i) accepting a bank check from a customer,
  ii) computing a balance due the customer,
  iii) delivering to the customer paper currency; and
  iv) delivering paper coupons to the customer, if the paper currency does not equal the balance due,
wherein the processing means determines whether to cash the check without securing account information about the customer.

16. A kiosk, comprising:
a) first means for executing a financial transaction with a customer; and
b) second means for ascertaining whether the transaction results in a refund due the customer and, if so,
  i) printing one or more paper coupons having face values determined by the refund, and
  ii) delivering the coupons to the customer,
wherein the kiosk comprises an Automated Teller Machine.

* * * * *